United States Patent
Chedore et al.

(10) Patent No.: US 12,176,946 B2
(45) Date of Patent: Dec. 24, 2024

(54) LASER SAFETY SHUTOFF OR POWER REDUCTION FOR OPTICALLY AMPLIFIED FIBER OPTIC LINKS WITH HIGH TRANSMISSION POWER

(71) Applicant: Ciena Corporation, Hanover, MD (US)

(72) Inventors: Paul Chedore, Ottawa (CA); Song Cao, Kanata (CA); Jean-Luc Archambault, Ottawa (CA)

(73) Assignee: Ciena Corporation, Hanover, MD (US)

(*) Notice: Subject to any disclaimer, the term of this patent is extended or adjusted under 35 U.S.C. 154(b) by 155 days.

(21) Appl. No.: 18/118,169

(22) Filed: Mar. 7, 2023

(65) Prior Publication Data

US 2024/0305368 A1  Sep. 12, 2024

(51) Int. Cl.
| | | |
|---|---|---|
| H04B 10/00 | (2013.01) | |
| H01S 3/067 | (2006.01) | |
| H01S 3/091 | (2006.01) | |
| H01S 3/16 | (2006.01) | |
| H04B 10/071 | (2013.01) | |
| H04J 14/00 | (2006.01) | |

(52) U.S. Cl.
CPC ........ H04B 10/071 (2013.01); H01S 3/06754 (2013.01); H01S 3/0912 (2013.01); H01S 3/1608 (2013.01)

(58) Field of Classification Search
CPC ..................................................... H04B 10/29
See application file for complete search history.

(56) References Cited

U.S. PATENT DOCUMENTS

| | | |
|---|---|---|
| 5,905,745 A | 5/1999 | Grubb et al. |
| 6,115,403 A | 9/2000 | Brenner et al. |
| 6,181,465 B1 | 1/2001 | Grubb et al. |
| 6,212,310 B1 | 4/2001 | Waarts et al. |
| 6,407,863 B1 | 6/2002 | Archambault et al. |
| 6,459,516 B1 | 10/2002 | Mizrahi et al. |
| 6,795,607 B1 | 9/2004 | Archambault et al. |
| 7,231,107 B1 | 6/2007 | Zhong et al. |
| 7,254,327 B1 | 8/2007 | Zhong et al. |

(Continued)

FOREIGN PATENT DOCUMENTS

| | | |
|---|---|---|
| EP | 2564532 B1 | 10/2017 |
| WO | 2020198294 A1 | 10/2020 |
| WO | 2022211898 A1 | 10/2022 |

OTHER PUBLICATIONS

International Telecommunication Union, "Optical Safety Procedures and Requirements for Optical Transport Systems", Feb. 2012, ITU-T G.664, 1-30 (Year: 2012).*

*Primary Examiner* — Daniel G Dobson
(74) *Attorney, Agent, or Firm* — Baratta Law PLLC; Lawrence A. Baratta, Jr.

(57) ABSTRACT

Laser safety shutoff or power reduction is disclosed for optically amplified fiber optic links with high transmission power. In an embodiment, a network element includes an amplifier configured to amplify one or more traffic carrying signals that are being transmitted over an optical fiber connected to the network element; a first receiver configured to receive a first monitoring signal that counter propagates over the optical fiber relative to the one or more traffic carrying signals; and circuitry configured to one or more of reduce power of the amplifier and shut off lasers associated with the amplifier, responsive to a loss of signal at the first receiver.

17 Claims, 3 Drawing Sheets

(56) References Cited

U.S. PATENT DOCUMENTS

| | | | |
|---|---|---|---|
| 7,693,357 B2 | 4/2010 | Marrakchi El Fellah et al. | |
| 7,962,049 B2 | 6/2011 | Mateosky et al. | |
| 8,457,497 B2 | 6/2013 | Zhong et al. | |
| 8,625,994 B2 | 1/2014 | Archambault et al. | |
| 9,140,624 B2 | 9/2015 | Bao et al. | |
| 9,419,708 B2 | 8/2016 | Rad et al. | |
| 9,680,569 B2 | 6/2017 | Archambault et al. | |
| 9,768,902 B2 | 9/2017 | Al Sayeed et al. | |
| 9,793,986 B2 | 10/2017 | Archambault et al. | |
| 10,237,633 B2 | 3/2019 | Chedore et al. | |
| 10,263,386 B1 | 4/2019 | Sridhar et al. | |
| 10,277,352 B2 | 4/2019 | Chedore et al. | |
| 10,615,867 B1 | 4/2020 | Bhatnagar et al. | |
| 10,630,417 B1 | 4/2020 | Chedore et al. | |
| 10,826,601 B2 | 11/2020 | Bhatnagar et al. | |
| 10,992,374 B1 | 4/2021 | Miedema et al. | |
| 11,108,489 B1 | 8/2021 | Archambault et al. | |
| 11,258,509 B2 | 2/2022 | Chedore et al. | |
| 2009/0041463 A1 | 2/2009 | Zhong et al. | |
| 2009/0067844 A1 | 3/2009 | Archambault et al. | |
| 2014/0055777 A1 | 2/2014 | Archambault et al. | |
| 2017/0125968 A1* | 5/2017 | Hochhalter | H01S 3/094003 |
| 2018/0076884 A1 | 3/2018 | Archambault et al. | |
| 2019/0238251 A1 | 8/2019 | Chedore et al. | |
| 2020/0007262 A1 | 1/2020 | Chedore et al. | |
| 2020/0119829 A1 | 4/2020 | Chedore et al. | |
| 2021/0211193 A1 | 7/2021 | Archambault et al. | |
| 2022/0120615 A1 | 4/2022 | Pei et al. | |
| 2022/0231778 A1 | 7/2022 | Archambault et al. | |
| 2022/0255282 A1 | 8/2022 | Al Sayeed et al. | |
| 2023/0059478 A1* | 2/2023 | DiGiovanni | H01S 3/1608 |

\* cited by examiner

LASER SAFETY SHUTOFF OR POWER REDUCTION FOR OPTICALLY AMPLIFIED FIBER OPTIC LINKS WITH HIGH TRANSMISSION POWER

FIELD OF THE DISCLOSURE

The present disclosure relates generally to fiber optics. More particularly, the present disclosure relates to systems and methods for laser safety shutoff or power reduction for low latency fibers and/or high transmission power in optically amplified fiber optic links.

BACKGROUND OF THE DISCLOSURE

Conventional fiber optic systems with optical amplifiers include various automatic shutdown mechanism for laser safety when a fiber is removed from a module or when there is a fiber cut on the link. For example, some conventional approaches are described in commonly-assigned U.S. Pat. No. 8,817,245, issued Aug. 26, 2014, and entitled "High-powered optical module safety systems and methods," and U.S. Pat. No. 10,541,748, issued Jan. 21, 2020, and entitled "Multi-fiber interface automatic power reduction systems and methods," the contents of each are incorporated by reference in their entirety. Example optical amplifier systems and methods can include Raman amplifiers, Erbium Doped Fiber Amplifiers (EDFAs), and the like. These conventional systems and methods are designed to shut down pumps or the like in an optical amplifier in the event of a fiber cut or open connector. From a detection perspective, fiber cuts are detected by a loss of signal such as, for example, due to an interruption of an Optical Service Channel (OSC). Open connections can be detected using a back reflection monitor which can be a combination of an optical tap and a photodetector. Conventional safety shutdown/detection mechanisms in optical amplifiers are designed to meet eye safety standards, and are focused on detecting fiber breaks or open connectors.

With respect to detecting a loss of signal, via an interruption of an OSC, this works well on standard optical fiber. There is a new type of optical fiber being deployed, namely Hollow Core Fiber, and one aspect of this new type of optical fiber is significantly less latency than standard optical fiber and has significantly lower non-linear interactions in the fiber, allowing for much higher signal launch powers that reduce the amount of linear noise accumulation. Launch powers of this level require much faster automatic power reduction mechanisms than what is employed today. As such, a detection mechanism based on the interruption of an OSC does not work.

BRIEF SUMMARY OF THE DISCLOSURE

The present disclosure relates to systems and methods for laser safety shutoff or power reduction for low latency fibers and/or high transmission power in optically amplified fiber optic links. As described herein, Hollow Core Fiber is an example of a low latency fiber and high transmission power where an interruption of a copropagating OSC signal is not fast enough for automatic laser shutoff, such as due to the high transmission power. In various embodiments, the present disclosure includes a detection mechanism/architecture more suitable for aggregate signal launch powers, such as, e.g., in the 33 dBm range. Specifically, the present disclosure utilizes one to two signals, counter-propagating from traffic carrying signals, on a single, low latency/high launch power fiber to detect an interruption for automatic laser shutoff. This approach is significantly quicker to detect such interruption and to speed up the automatic laser shutoff procedure, which is required in a low latency optical fiber where the transmission powers can be significantly higher. In general, fibers that can benefit from high-powered amplifiers can be referred to as highly linear fibers, of which Hollow Core Fiber is one example. Of course, the present disclosure contemplates use on any type of highly linear fibers as well as other fiber types.

In an embodiment, a network element includes an amplifier configured to amplify one or more traffic carrying signals that are being transmitted over an optical fiber connected to the network element; a first receiver configured to receive a first monitoring signal that counter propagates over the optical fiber relative to the one or more traffic carrying signals; and circuitry configured to one or more of reduce power of the amplifier and shut off lasers associated with the amplifier, responsive to a loss of signal at the first receiver. The network element can further include a second receiver configured to receive a second monitoring signal that counter propagates over the optical fiber relative to the one or more traffic carrying signals, wherein the circuitry is further configured to one or more of reduce power of the amplifier and shut off lasers associated with the amplifier, responsive to a loss of signal at the both the first receiver and the second receiver. The optical fiber can be a low latency fiber, a hollow core fiber, a highly linear fiber, or a combination thereof. The amplifier can be a high-powered amplifier (e.g., >26 dBm output power). The monitoring signal can be an Optical Service Channel (OSC). The first monitoring signal and the second monitoring signal can be any of an Optical Service Channel (OSC), a telemetry signal, an Optical Time Domain Reflectometer (OTDR) signal used to monitor health of the optical fiber, and a polarimeter signal used to monitor for State of Polarization (SOP) changes on the optical fiber. The first monitoring signal and the second monitoring signal can be configured to continually operate in an opposite direction as the one or more traffic carrying signals, over the optical fiber. The loss of signal can be a fiber cut of the optical fiber, and the one or more of reduce power of the amplifier and shut off lasers associated with the amplifier is performed in less than 100 ms from the fiber cut.

In another embodiment, a method of fast detection of a fiber cut includes receiving a first monitoring signal from an optical fiber, wherein the first monitoring signal counter propagates over the optical fiber relative to any traffic carrying signals thereon; detecting a loss of signal for the first monitoring signal; and determining a fiber cut based on the detecting and causing one or more of reducing power of an amplifier connected to the fiber and shutting off lasers associated with the amplifier. The steps can further include detecting a loss of signal for a second monitoring signal, such that the fiber cut is determined when there is the loss of signal for both the first monitoring signal and the second monitoring signal. The optical fiber can be one of a hollow core fiber, a low latency fiber, a highly linear fiber, and a combination thereof. The amplifier can be a high-powered amplifier (e.g., output power >26 dBm). The first monitoring signal can be an Optical Service Channel (OSC). The first monitoring signal and a second monitoring signal can be any of an Optical Service Channel (OSC), a telemetry signal, an Optical Time Domain Reflectometer (OTDR) signal used to monitor health of the optical fiber, and a polarimeter signal used to monitor for State of Polarization (SOP) changes on the optical fiber, wherein detecting includes a loss of signal for both the first monitoring signal and the second monitoring signal. The first monitoring signal can be configured to continually operate in an opposite direction as the one or more traffic carrying signals, over the optical fiber. The loss of signal can be a fiber cut of the optical fiber, and the one or more of reduce power of the amplifier and shut off lasers associated with the amplifier is performed in less than 100 ms from the fiber cut.

In a further embodiment, a non-transitory computer-readable medium includes instructions that, when executed, cause one or more processors to perform steps of, responsive to receiving a first monitoring signal from an optical fiber, wherein the first monitoring signal counter propagates over the optical fiber relative to any traffic carrying signals thereon, detecting a loss of signal for the first monitoring signal; and determining a fiber cut based on the detecting and causing one or more of reducing power of an amplifier connected to the fiber and shutting off lasers associated with the amplifier. The steps can further include detecting a loss of signal for a second monitoring signal, such that the fiber cut is determined when there is the loss of signal for both the first monitoring signal and the second monitoring signal.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
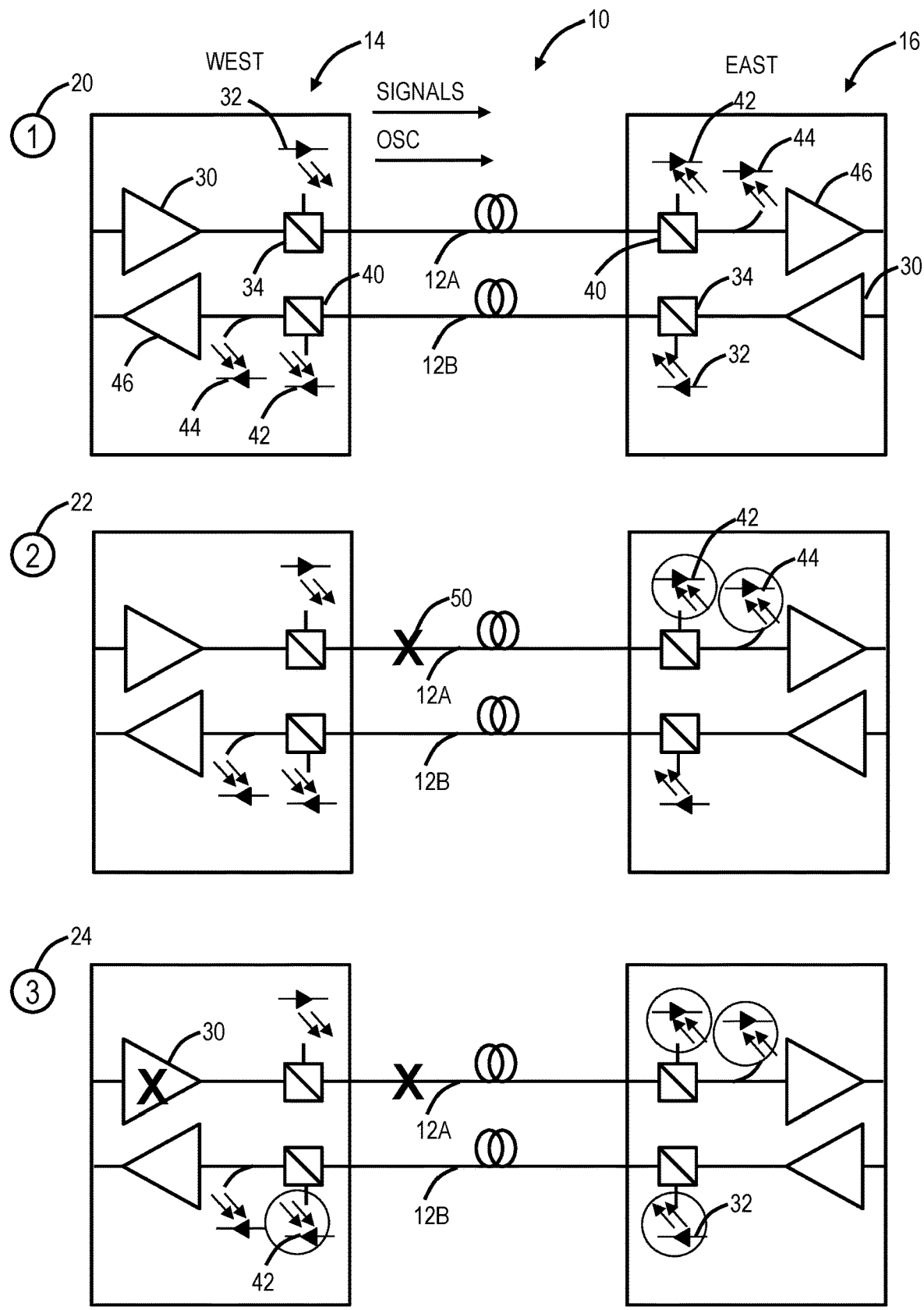
FIG. 1 is a network diagram of an example fiber optic system with conventional, glass core fibers, for illustrating conventional automatic laser shutoff.

Again, the present disclosure relates to systems and methods for laser safety shutoff or power reduction for low latency fibers and/or high transmission power in optically amplified fiber optic links. As described herein, Hollow Core Fiber is an example of a low latency fiber and high transmission power where an interruption of a copropagating OSC signal is not fast enough for automatic laser shutoff, such as due to the high transmission power. In various embodiments, the present disclosure includes a detection mechanism/architecture more suitable for aggregate signal launch powers, such as, e.g., in the 33 dBm range. Specifically, the present disclosure utilizes one to two signals, counter-propagating from traffic carrying signals, on a single, low latency/high launch power fiber to detect an interruption for automatic laser shutoff. This approach is significantly quicker to detect such interruption and to speed up the automatic laser shutoff procedure, which is required in a low latency optical fiber where the transmission powers can be significantly higher. In general, fibers that can benefit from high-powered amplifiers can be referred to as highly linear fibers, of which Hollow Core Fiber is one example. Of course, the present disclosure contemplates use on any type of highly linear fibers as well as other fiber types.

Hollow Core Fiber

The commercial viability and deployment of hollow core fiber is approaching. As described herein, hollow core fibers are one example of low latency fibers, where the relative term "low" is in reference to conventional glass core fibers, such as, for example, Non-Dispersion Shifted Fiber (NDSF), Non-Zero Dispersion Shifted Fiber (NZDSF), Single Mode Fiber (SMF), and the like. Of note, hollow core fibers provide several benefits, namely low latency and the absence of non-linear interaction which allows for much higher span launch powers from dropped amplifiers. As the name implies, hollow core fibers do not have a glass core. A hollow core fiber is an optical fiber which guides light essentially within a hollow region, so that only a minor portion of the optical power propagates in the solid fiber material (typically a glass). The light is confined to the hollow core by holes in the surrounding glass material, which looks like a honeycomb in a cross-section.

The absence of a glass core leads to ~1.5× faster propagation speeds (lower latency) and a lack of non-linear interaction as signals travels down the fiber, which is another benefit of hollow core fibers. With conventional fibers having glass cores, typical transmission networks try to balance the launch of signals at higher power to improve linear noise performance with the lower powers needed to mitigate non-linear penalties. In the absence of non-linear penalties provided by hollow core fibers, it is possible to increase signal launch powers significantly. Presently we are targeting 33 dBm for hollow core fiber applications which is ~12× the output power of the typical 23 dBm boosters used today with SMF, i.e., a glass core fiber.

There is a requirement to abide by the class 1M laser safety requirements. While hollow core fiber provides important benefits-low latency and much higher signal launch power, these benefits provide a challenge for abiding by the class 1M laser safety requirements, namely there is a need for faster detection time due to the lower latency and the higher power.

Examples of Hollow Core Fiber include a Photonic Bandgap HCF, Hollow Core fiber anti-resonant (HC-ARF), nested anti-resonant nodeless fibre (NANF) available from Lumenisity, and the like. Details of field deployments of Hollow Core Fiber are presented in Saljoghei, A., et al. "First Demonstration of Field-Deployable Low Latency Hollow-core Cable capable of supporting> 1000 km, 400 Gb/s WDM Transmission." arXiv preprint arXiv: 2106.05343 (2021), the contents of which are incorporated by reference. Further, the following table provides some aspects of performance between conventional fiber and future fibers:

| Performance Parameter | Typical Today | Future |
|---|---|---|
| C-Band Output Power Amps | 23 dBm | 27 dBm-34 dBm |
| Lower Non-Linearity Amps | ~1/200 SMF | ~1/2000 SMF |
| Wider Optical Spectrum | 100 nm | 200 nm |
| Lower Latency Modems | Micro secs | 100 s of Nano secs |
| HC-ARF DSP | unnecessary | possible |

It is important to note the benefits of hollow core fibers will drive their deployment as it is advantageous to achieve significantly lower latency and much higher launch power. The present disclosure provides a novel safety mechanism for these high-power discrete amplifier designs, which are required for both operator safety and equipment safety.

Low Latency Fiber

As described herein, hollow core fibers are one example of low latency fibers. The speed at which light propagates in an optical fiber is based on the index of refraction of the medium, namely $$v = \frac{c}{n}$$

Where c is the speed of light in a vacuum, e.g., ~3×10$^8$ m/s, v is the speed of light in a material, and n is the index of refraction of the material.

As an example, the index of refraction for silica glass or doped silica glass is around 1.44 to 1.45, and the index of refraction for air is essentially 1 (i.e., 1.00293). Thus, it can be seen that light propagates significantly faster in hollow core fibers which use air for the transmission medium.

The present disclosure also contemplates other types of fiber as low latency, namely any optical fiber that has its index of refraction less than that of silica glass, i.e., 1.44. Of course, the fast detection techniques described herein contemplate use with any type of optical fiber, including ones with silica glass-based cores. A driver for the use of the hollow core fiber is the lower latency/faster transmission speed in hollow core fibers, as well as any other low latency fibers, where low can be <1.44.

Higher Transmission Power

A driver for the fast detection technique is higher transmission power. Of note, lower latency and the lack of non-linear interaction are two of the key advantages of Hollow Core Fiber, again highly linear fibers. The lack of non-linear interaction means we can launch signal at ~12× the power level we do today. That is, as described herein, higher transmission power can mean about an order of magnitude more power than conventional approaches, e.g., 33 dBm for higher transmission power versus 23 dBm for conventional approaches. The high power means we need a much faster automatic power reduction mechanism than what can be achieved using the sorts of solutions used today. That is, the various approaches described herein can lower the power in a sufficiently short period of time, from conventional approaches, should there be a fiber disconnect or break.

Of note, while Hollow Core Fiber is one example of a fiber type that supports higher transmission power, those skilled in the art will recognize the present disclosure contemplates use with other fiber types that may support such transmission power as well as regular fiber types, to provide a quicker mechanism for detection.

Conventional Automatic Laser Shutoff

FIG. 1 is a network diagram of an example fiber optic system 10 with conventional, glass core fibers 12A, 12B, for illustrating conventional automatic laser shutoff. For illustration purposes, there is a west module 14 and an east module 16, where "west" and "east" are logical terms to denote two network elements in a fiber optic span. The network elements can be Reconfigurable Optical Add/Drop Multiplexers (ROADMs) and there can be intermediate network elements in between the modules 14, 16, e.g., intermediate optical line amplifiers, which are omitted for illustration purposes. Also, other equipment such as multiplexers, Wavelength Selective Switches (WSSs), modems, etc. are also omitted for illustration purposes.

FIG. 1 includes the fiber optic system 10 in three stages 20, 22, 24 to illustrate conventional automatic laser shutoff. Also, in this example, the modules 14, 16 have similar components. The fiber optic system 10 is a bi-directional system where the module 14 transmits to the module 16 via the fiber 12A and the module 16 transmits to the module 14 via the fiber 12B.

The components in the modules 14, 16 are described as follows. Those skilled in the art will recognize other embodiments are contemplated. On the transmit side, the modules 14, 16 include a post-amplifier 30 followed by an OSC transmitter 32 which is added via a coupler 34. On the receive side, the modules 14, 16 includes a coupler 40 for splitting off the OSC signal to an OSC receiver 42, a splitter to an Optical Channel Monitor (OCM) 44, and a pre-amplifier 46. These components form a bi-directional communication link over the fibers 12A, 12B.

At the stage 20, the fiber optic system 10 is operating normally. At the stage 22, there is a fault 50 affecting the fiber 12A. This fault 50 is initially detected by the OSC receiver 42 and the OCM 44. At the stage 24, the OSC transmitter 32 at the node 16 transmits an indication of the fault 50 to the module 14, which receives the indication at the OSC receiver 42, then places the post-amplifier 30 in a shut off state. Note, in the FIGS., the arrows on the elements 32, 42, 44 show direction indicative of whether the elements 32, 42, 44 are transmitters or receivers. Specifically, the OSC transmitter 32 has the arrows pointing towards the fibers 12A, 12B indicating transmission, whereas the receiver 42 and the OCM 44 have the arrows pointing from the fibers 12A, 12B indicating reception.

This example in FIG. 1 illustrates a more challenging use case for laser safety, namely a unidirectional fiber cut where one of the fibers from a pair is still continuous, such as illustrated in FIG. 1, with the fault 50. Today, in these scenarios, we detect a fault at the downstream module 16 and signal back to the head end module 14 to shut down the amplifier 30. The delay associated with this response is acceptable with powers in the 23 dBm range, as in the launch power into conventional glass core fibers, but not for powers in the 33 dBm range, as in the launch power into hollow core fibers. Additionally, APR responses can require the presence of two conditions before triggering an APR response to avoid having the malfunction of a single device, such as a photodiode or pluggable transceiver take down all traffic.

That is, the detection process of the fault 50 on the fiber 12A requires bi-directional communication between the modules 14, 16.

Today, with silica glass cores, the amplifier 30, which is an EDFA, has an output power around 23 dBm. The requirement to shut off or lower power on such an amplifier do to a fiber cut is on the order of less than 2 s, and typical approaches, such as in FIG. 1, operate under 250 ms or so.

With hollow core fiber, the amplifier 30 can be much higher power, e.g., 33 dBm or more. Here the amplifier 30 can be a higher power EDFA. With respect to timing, 250 ms is not fast enough and the requirement is on the order of 100 ms or less, such as 60 ms or less. This timing cannot be achieved with the approach in FIG. 1 which can be referred to as a far end signaling approach. That is, the module 14 does not know to shut down its amplifier 30 until there is some signaling from the module 16 (or lack of signaling).

The automatic laser shutoff process in FIG. 1, for conventional glass fibers and amplifiers (EDFAs), is not compatible with higher output powers (e.g., ~33 dBm) and with the lower latency on the fibers 12. The higher output power drives the need for a much faster Automatic Power Reduction (APR) response then we can achieve today in all scenarios.

Accordingly, the present disclosure requires a faster detection mechanism to enable power reduction of higher-powered amplifiers.

Faster Automatic Laser Shutoff

The present disclosure provides a faster automatic laser shutoff detection mechanism, namely one that is local only, i.e., confined to the module 14. This approach speeds up the detection of the fault 50, enabling the module 14 to lower power or shut down the amplifier 30 much faster than 250 ms, including less than 100 ms or even less than 60 ms. That is, the term "faster automatic laser shutoff" or "fast automatic laser shutoff" means faster than 250 ms, including less than 100 ms or even less than 60 ms.

Generally, the faster automatic laser shutoff detection mechanism includes losing two signals that are used to continually monitor the connection on the fiber 12A. These two signals must counter-propagate relative to the traffic carrying signals as the faster requirements include the need to locally detect the fiber cut. By counter-propagating, these two signals are detected locally at the module 14, and when they both are lost, it can be assumed there is a fiber cut and the automatic laser shutoff on the amplifier 30 should occur.

Note, there is a need for two signals to ensure failure of a component of one of the signals does not trigger the automatic laser shutoff incorrectly, i.e., one signal fails, shut down the amplifier 30, but there is not a fiber cut, rather there is a component failure.

In an embodiment, these two signals can be added to a fiber optic system. In another embodiment, it is possible to use existing monitoring signals so that there is no need to add extra equipment. For example, fiber optic systems include OSCs for point-to-point communication over the fibers 12A, 12B, i.e., point-to-point communication between each network element, including ROADM/terminal network elements and intermediate line amplifier network elements. Fiber optic systems also include other monitoring signals, such as telemetry signals used to monitor Raman gain, Optical Time Domain Reflectometer (OTDR) signals used to monitor the fiber health, polarimeter signals used to monitor for State of Polarization (SOP) changes, and the like. These other monitoring signals share similar characteristics as the OSC, namely they are continuous on the fibers 12A, 12B, have wavelengths outside of any traffic carrying wavelength ranges, and the like.

Example hardware configurations for all of the monitoring signals is described in commonly-assigned U.S. Pat. No. 9,148,710, issued Sep. 29, 2015, and entitled "Raman amplifier system and method with integrated optical time domain reflectometer," and commonly-assigned U.S. Pat. No. 10,411,796, issued Sep. 10, 2019, and entitled "Optical fiber characterization measurement systems and methods," the contents of which are incorporated by reference in their entirety. Specifically, U.S. Pat. Nos. 9,148,710 and 10,411,796 describe hardware realization of the OSC, the telemetry signal to monitor Raman gain, the OTDR signal, and the polarimeter signal. Importantly, at least two of these signals operate in-service at any given time, so these can be used to detect a fiber cut. These signals can be collectively referred to as monitoring signals, and can include at least two of the OSC, the telemetry signal to monitor Raman gain, the OTDR signal, and the polarimeter signal.

Now, these monitoring signals are configured in U.S. Pat. Nos. 9,148,710 and 10,411,796 to co-propagate with the traffic carrying signals. See FIG. 1, where the signals (meant to represent all traffic carrying signals, i.e., Wavelength Division Multiplexed (WDM) channels) are propagating from West to East (left to right) and so is the OSC. That is, co-propagate means signals travel in the same direction whereas counter-propagate means the signals travel in opposite directions.

An aspect of the present disclosure is to change the propagation direction of these monitoring signals, so that they counter-propagate relative to the traffic carrying signals. In this manner, the module 14 can locally detect the fiber cut, i.e., the fault 50, such as in the unidirectional fiber cut scenario of FIG. 1. It is noted that changing the propagation direction of these monitoring signals still allows them to operate for their normal intended purpose, e.g., service channel, Raman gain monitoring, SOP detection, fiber health monitoring, etc., as well as further purposing them to detect a fiber cut for enabling faster automatic laser shutoff.

Note, in an embodiment, the telemetry signal may already be counter-propagating relative to the WDM channels, and the present disclosure contemplates changing the OSC to counter-propagate as well.

Figure 2:
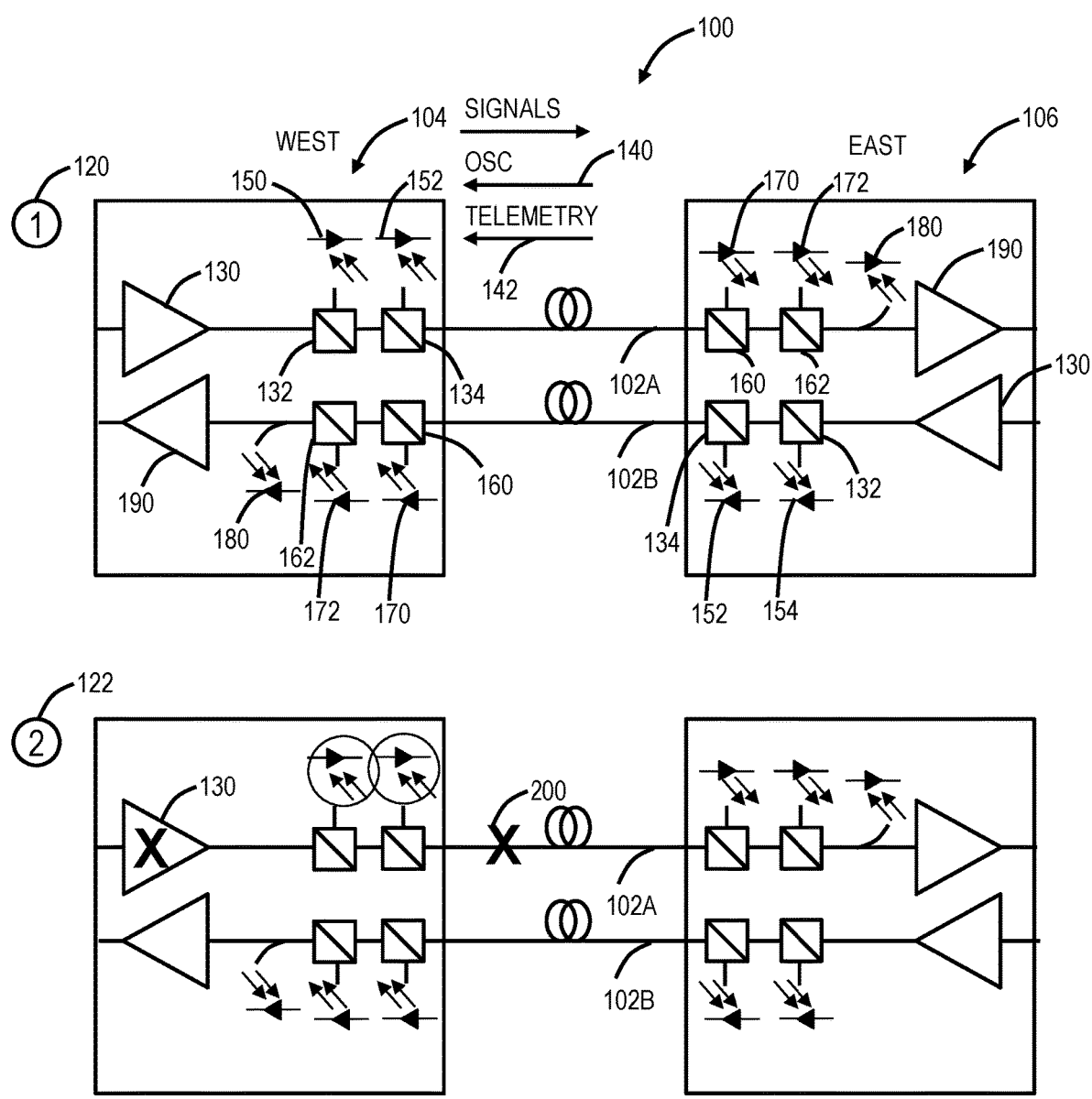
FIG. 2 is a network diagram of an example fiber optic system with hollow cores fibers, for illustrating faster automatic laser shutoff.

FIG. 2 is a network diagram of an example fiber optic system 100 with hollow cores fibers 102A, 102B, for illustrating faster automatic laser shutoff. Again, for illustration purposes, there is a west module 104 and an east module 106, where "west" and "east" are logical terms to denote two network elements in a fiber optic span. The modules 104, 106 can be part of a network element, such as a ROADM, and there can be intermediate network elements in between the modules 104, 106, e.g., intermediate optical line amplifiers, which are omitted for illustration purposes. Also, other equipment such as multiplexers, Wavelength Selective Switches (WSSs), modems, etc. are also omitted for illustration purposes. That is, the fiber optic system 100 illustrates only the necessary components for implementing the fast automatic laser shutoff. The fiber optic system 100 can include an Optical Multiplex Section (OMS), and those skilled in the art will recognize a practical implementation in a network can include multiple OMSs, etc.

FIG. 2 includes the fiber optic system 100 in two stages 120, 122 to illustrate the faster automatic laser shutoff. Also, in this example, the modules 104, 106 have similar components, but this does not necessarily need to be the case. The fiber optic system 100 is a bi-directional system where the module 104 transmits to the module 106 via the fiber 102A and the module 106 transmits to the module 104 via the fiber 102B. The fibers 102A, 102B can be low latency fibers, including hollow core fibers.

The components in the modules 104, 106 are described as follows. Those skilled in the art will recognize other embodiments are contemplated. On the transmit side, the modules 104, 106 include a post-amplifier 130 which can be an EDFA. Of note, the faster automatic laser shutoff is concerned with shutting off or lowering the power of the post-amplifier 130 when there is a fiber cut on either of the fibers 102A, 102B. As described herein, a high powered amplifier means one with output power >26 dBm, such as on the order of 33 dBm.

Following the post-amplifier 130 (either immediately or with intermediate components omitted for illustration purposes in FIG. 2), there are two couplers 132, 134, each configured to split a respective monitoring signal 140, 142 to a respective receiver 150, 152. For example, the monitoring signals 140, 142 can include an OSC 140 and a telemetry signal 142. The OSC 140 can be split out by the coupler 134 and received at the receiver 152, and the telemetry signal 142 can be split out by the couple 132 and received by the receiver 150. Other embodiments are also contemplated, i.e., the monitoring signals 140, 142 can be a polarimeter signal, an OTDR signal, etc., and the order of the receivers 150, 152 can also be switched. Of note, the various monitoring signals are at different wavelengths from one another, and at different wavelengths from the WDM channels.

The module 104 transmits on the fiber 102A, namely the WDM channels, and receives the monitoring signals 140, 142 from the fiber 102A, at the receivers 150, 152. At end of the fibers 102A, 102B, there are two couplers 160, 162 that are configured to add the monitoring signals 140, 142 from transmitters 170, 172. For example, the transmitter 170 provide the OSC 140, and the transmitter 172 provide the telemetry signal 142; of course, other embodiments are contemplated. Following the couplers 160, 162 there is an OCM 180 and a pre-amplifier 190.

These components in the modules 104, 106 form a bi-directional communication link over the fibers 102A, 102B. Of course, there are other components omitted for illustration purposes, e.g., transceivers, modems, WSSs, and the like.

Again, note, in the FIGS., the arrows on the elements 150, 152, 170, 172, 180 show direction indicative of whether the elements 150, 152, 170, 172, 180 are transmitters or receivers. Specifically, the transmitters 170, 172 have the arrows pointing towards the fibers 102A, 102B indicating transmission, whereas the receivers 150, 152 and the OCM 180 have the arrows pointing from the fibers 102A, 102B indicating reception.

With the components now described in FIG. 2 for the modules 104, 106, operation of the fast automatic laser shutoff is described. At the stage 120, the fiber optic system 100 is operating normally, i.e., there are no fiber cuts on the fibers 102A, 102B, the WDM channels are propagating in one direction and the monitoring signals 140, 142 are counter-propagating in the other direction, over the fibers 102A, 102B.

At the stage 122, there is a fiber cut, i.e., fault 200, on the fiber 102A, similar to the fault 50 in FIG. 1. This fault 200 is quickly detected based on a loss of signal (LOS) at the receivers 150, 152, on the order of milliseconds or less. Once there is the LOS on both the receivers 150, 152, the module 104 can cause fast automatic laser shutoff or automatic power reduction on the post amplifier 130. Note, the present disclosure contemplates laser shutoff or power reduction-either approach is fine as long as the power levels out of the amplifier 130 are reduced below the Class 1M safety levels. Class 1M is one example of safe levels; those skilled in the art will recognize other safety specifications can be used.

That is, the fast detection uses LOS of the counter propagating OSC and a telemetry channel as trigger to local shut down or lowering of the amplifier's 130 output for safety purposes.

Of note, the OCM 180 can be used as well to trigger shutoff or power reduction of the pre amplifier 190. That is, input Loss of Signal (LOS) on the OCM 180 could be used to lower the post amplifier 130 power, but in general, we look for two triggers. An LOS on the OCM 180 does not provide any indication that a fiber connected to the pre amplifier 190 is launching into is open or broken. Further, existing techniques can be used in conjunction with the fast automatic laser shutoff, such as back reflection detection to determine a connector disconnection or dirty connector.

Also, note FIG. 2 is described with reference to two monitoring signals 140, 142, both counterpropagating. This is to avoid false positives in practical applications, namely a need for both of the monitoring signals 140, 142 to be down (loss of signal) for the shutoff or power reduction. For example, it could be possible that one of the monitoring signals 140, 142 is down such as due to a hardware failure. In this case, one would not want to trigger shutoff or power reduction as it is not needed. However, those skilled in the art will recognize this is an added feature and the present disclosure can operate with only one of the monitoring signals 140, 142.

Network Element

In an embodiment, a network element includes an amplifier configured to amplify one or more traffic carrying signals that are being transmitted over an optical fiber connected to the network element; a first receiver configured to receive a first monitoring signal that counter propagates over the optical fiber relative to the one or more traffic carrying signals; an optical second receiver configured to receive a second monitoring signal that counter propagates over the optical fiber relative to the one or more traffic carrying signals; and circuitry configured to one or more of reduce power of the amplifier and shut off lasers associated with the amplifier, responsive to a loss of signal at either the first receiver or both of the first receiver and the second receiver. Note, the network element can include the modules 104, 106, or similar hardware to implement the functionality described herein. The network element can be a terminal, ROADM, etc.

The optical fiber can be a low latency fiber, such as a hollow core fiber. Again, as described herein, low latency means lower than latency on traditional glass or silica core fibers. The amplifier can be a high-powered amplifier. Again, as described herein, hollow core fiber supports significantly higher launch power, e.g., high-powered amplifier means >26 dBm.

The first monitoring signal can be an Optical Service Channel (OSC). In other embodiments, the first monitoring signal and the second monitoring signal can be any of an Optical Service Channel (OSC), a telemetry, an Optical Time Domain Reflectometer (OTDR) signal used to monitor health of the optical fiber, and a polarimeter signal used to monitor for State of Polarization (SOP) changes on the optical fiber. That is, the monitoring signals can be existing signals in a fiber optic system that are further purposed for fast detection of fiber cuts.

The first monitoring signal and the second monitoring signal are configured to continually operate in an opposite direction as the one or more traffic carrying signals, over the optical fiber. The loss of signal can be a fiber cut of the optical fiber, and the one or more of reduce power of the amplifier and shut off lasers associated with the amplifier is performed in less than 100 ms from the fiber cut.

Process

Figure 3:
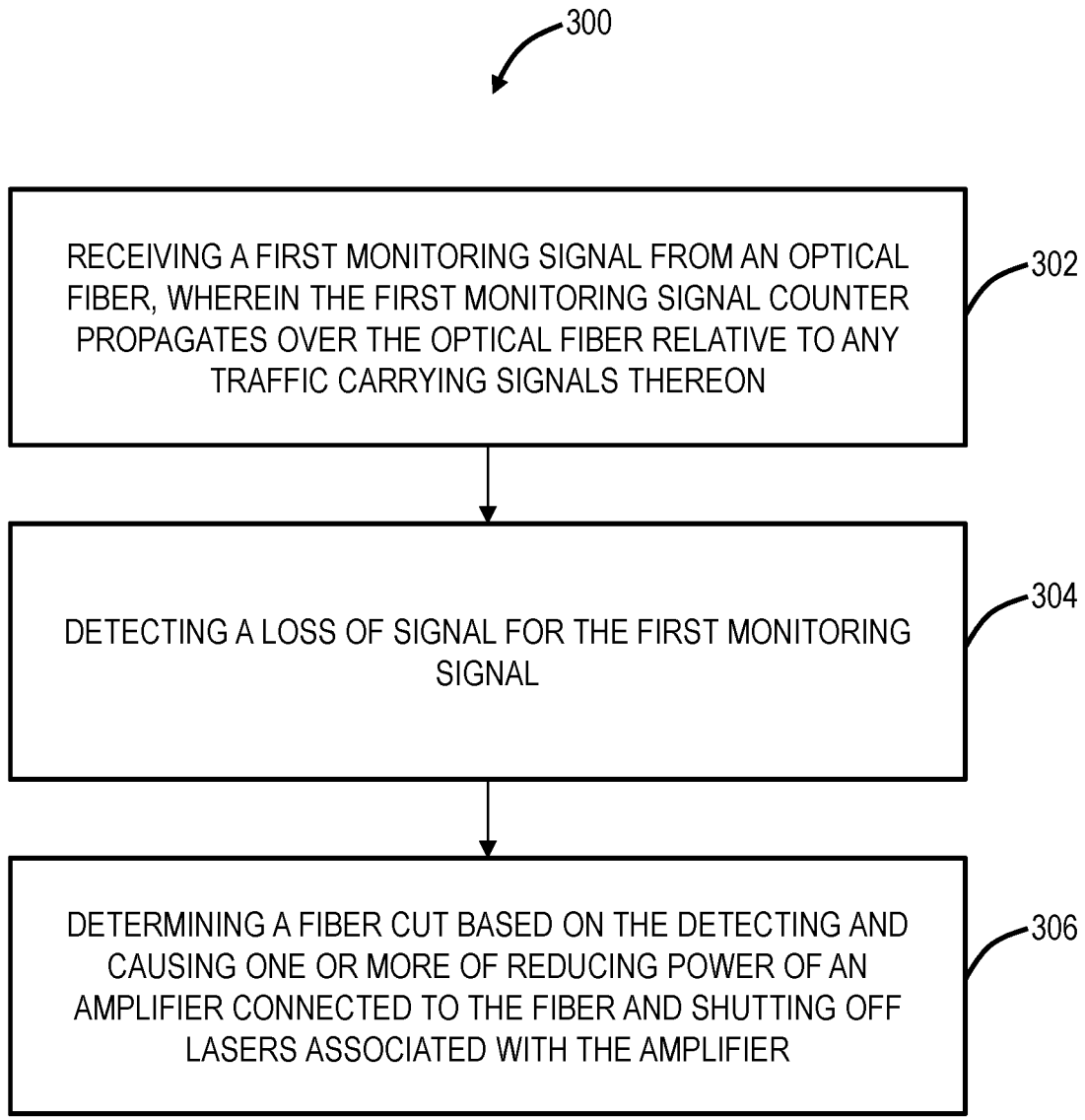
FIG. 3 is a flowchart of a process for fast detection of a fiber cut.

FIG. 3 is a flowchart of a process 300 for fast detection of a fiber cut. The process 300 contemplates implementation as a method having steps 302, 304, 306, via hardware configured to implement the steps, such as the modules 104, 106, the network element described above, etc., and as instructions stored in a non-transitory computer-readable medium where the instructions cause one or more processors to implement the steps.

The process 300 includes receiving a first monitoring signal from an optical fiber, wherein the first monitoring signal counter propagates over the optical fiber relative to any traffic carrying signals thereon (step 302); detecting a loss of signal for the first monitoring signal (step 304); and determining a fiber cut based on the determining and causing one or more of reducing power of an amplifier connected to the fiber and shutting off lasers associated with the amplifier (step 306). The process 300 can further include detecting a loss of signal for a second monitoring signal, such that the fiber cut is determined when there is the loss of signal for both the first monitoring signal and the second monitoring signal, The optical fiber can be a low latency fiber, such as a hollow core fiber. Again, as described herein, low latency means lower than latency on traditional glass or silica core fibers. The amplifier can be a high-powered amplifier. Again, as described herein, hollow core fiber supports significantly higher launch power, e.g., high-powered amplifier means >26 dBm.

The first monitoring signal can be an Optical Service Channel (OSC). In other embodiments, the first monitoring signal and the second monitoring signal can be any of an Optical Service Channel (OSC), a telemetry signal, an Optical Time Domain Reflectometer (OTDR) signal used to monitor health of the optical fiber, and a polarimeter signal used to monitor for State of Polarization (SOP) changes on the optical fiber. That is, the monitoring signals can be existing signals in a fiber optic system that are further purposed for fast detection of fiber cuts.

The first monitoring signal and the second monitoring signal are configured to continually operate in an opposite direction as the one or more traffic carrying signals, over the optical fiber. The loss of signal can be a fiber cut of the optical fiber, and the one or more of reduce power of the amplifier and shut off lasers associated with the amplifier is performed in less than 100 ms from the fiber cut.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A network element comprising:
   an amplifier configured to amplify one or more traffic carrying signals that are being transmitted over an optical fiber connected to the network element;
   a first receiver configured to receive a first monitoring signal that counter propagates over the optical fiber relative to the one or more traffic carrying signals;
   circuitry configured to one or more of reduce power of the amplifier and shut off lasers associated with the amplifier, responsive to a loss of signal at the first receiver; and
   a second receiver configured to receive a second monitoring signal that counter propagates over the optical fiber relative to the one or more traffic carrying signals, wherein the circuitry is further configured to one or more of reduce power of the amplifier and shut off lasers associated with the amplifier, responsive to a loss of signal at the both the first receiver and the second receiver.

2. The network element of claim 1, wherein the optical fiber is a low latency fiber.

3. The network element of claim 1, wherein the optical fiber is a hollow core fiber.

4. The network element of claim 1, wherein the optical fiber is a highly linear fiber.

5. The network element of claim 1, wherein the amplifier is a high-powered amplifier.

6. The network element of claim 1, wherein the first monitoring signal is an Optical Service Channel (OSC).

7. The network element of claim 1, wherein the first monitoring signal and the second monitoring signal are any of an Optical Service Channel (OSC), a telemetry signal, an Optical Time Domain Reflectometer (OTDR) signal used to monitor health of the optical fiber, and a polarimeter signal used to monitor for State of Polarization (SOP) changes on the optical fiber.

8. The network element of claim 1, wherein the first monitoring signal and the second monitoring signal are configured to continually operate in an opposite direction as the one or more traffic carrying signals, over the optical fiber.

9. The network element of claim 1, wherein the loss of signal is a fiber cut of the optical fiber, and the one or more of reduce power of the amplifier and shut off lasers associated with the amplifier is performed in less than 100 ms from the fiber cut.

10. A method of fast detection of a fiber cut comprising steps of:
- receiving a first monitoring signal from an optical fiber, wherein the first monitoring signal counter propagates over the optical fiber relative to any traffic carrying signals thereon;
- detecting a loss of signal for the first monitoring signal;
- determining a fiber cut based on the detecting and causing one or more of reducing power of an amplifier connected to the fiber and shutting off lasers associated with the amplifier; and
- detecting a loss of signal for a second monitoring signal, such that the fiber cut is determined when there is the loss of signal for both the first monitoring signal and the second monitoring signal.

11. The method of claim 10, wherein the optical fiber is one of a hollow core fiber, a low latency fiber, a highly linear fiber, and a combination thereof.

12. The method of claim 10, wherein the amplifier is a high-powered amplifier.

13. The method of claim 10, wherein the first monitoring signal is an Optical Service Channel (OSC).

14. The method of claim 10, wherein the first monitoring signal and a second monitoring signal are any of an Optical Service Channel (OSC), a telemetry signal, an Optical Time Domain Reflectometer (OTDR) signal used to monitor health of the optical fiber, and a polarimeter signal used to monitor for State of Polarization (SOP) changes on the optical fiber, wherein detecting includes a loss of signal for both the first monitoring signal and the second monitoring signal.

15. The method of claim 10, wherein the first monitoring signal is configured to continually operate in an opposite direction as the one or more traffic carrying signals, over the optical fiber.

16. The method of claim 10, wherein the loss of signal is a fiber cut of the optical fiber, and the one or more of reduce power of the amplifier and shut off lasers associated with the amplifier is performed in less than 100 ms from the fiber cut.

17. A non-transitory computer-readable medium comprising instructions that, when executed, cause one or more processors to perform steps of:
- responsive to receiving a first monitoring signal from an optical fiber, wherein the first monitoring signal counter propagates over the optical fiber relative to any traffic carrying signals thereon, detecting a loss of signal for the first monitoring signal;
- determining a fiber cut based on the detecting and causing one or more of reducing power of an amplifier connected to the fiber and shutting off lasers associated with the amplifier; and
- detecting a loss of signal for a second monitoring signal, such that the fiber cut is determined when there is the loss of signal for both the first monitoring signal and the second monitoring signal.

* * * * *